US011825200B2

(12) United States Patent
Nalluri

(10) Patent No.: US 11,825,200 B2
(45) Date of Patent: Nov. 21, 2023

(54) FRAMING AN IMAGE OF A USER REQUESTING TO SPEAK IN A NETWORK-BASED COMMUNICATION SESSION

(71) Applicant: Microsoft Technology Licensing, LLC, Redmond, WA (US)

(72) Inventor: Vishnu Sandeep Nalluri, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/566,346

(22) Filed: Dec. 30, 2021

(65) Prior Publication Data
US 2023/0217113 A1 Jul. 6, 2023

(51) Int. Cl.
*H04N 23/69* (2023.01)
*H04L 65/40* (2022.01)
*H04N 5/262* (2006.01)
*H04N 23/80* (2023.01)
*H04N 23/695* (2023.01)

(52) U.S. Cl.
CPC ............. *H04N 23/69* (2023.01); *H04L 65/40* (2013.01); *H04N 5/2628* (2013.01); *H04N 23/695* (2023.01); *H04N 23/80* (2023.01)

(58) Field of Classification Search
CPC .... H04N 23/80; H04N 23/695; H04N 5/2628; H04N 23/69; H04L 65/40
USPC ............................... 348/14.02–14.9; 709/204
See application file for complete search history.

(56) References Cited

U.S. PATENT DOCUMENTS

| 9,554,091 | B1 | 1/2017 | Malegaonkar et al. |
| 11,350,029 | B1 * | 5/2022 | Ostap ........................ G06T 7/70 |
| 2005/0080849 | A1 * | 4/2005 | Wee ....................... H04L 67/131 |
| | | | 709/204 |
| 2008/0095401 | A1 | 4/2008 | Nimri et al. |
| 2013/0271559 | A1 | 10/2013 | Feng et al. |
| 2015/0312520 | A1 * | 10/2015 | Nohria ..................... G09B 7/02 |
| | | | 434/350 |

FOREIGN PATENT DOCUMENTS

CN 105933129 A 9/2016

OTHER PUBLICATIONS

"International Search Report and Written Opinion Issued in PCT Patent Application No. PCT/US22/044959", dated Jan. 18, 2023, 13 Pages.

* cited by examiner

*Primary Examiner* — Maria El-Zoobi
(74) *Attorney, Agent, or Firm* — Schwegman Lundberg & Woessner, P.A.

(57) ABSTRACT

Disclosed in some examples, are methods, systems, and machine-readable mediums for allowing participants of communication sessions joining from conference rooms to indicate a desire to speak using their own personal computing device, and, to automatically frame that user with the conference room camera using a position of the user determined automatically. For example, a user may have a communication application executing on their mobile device that is logged into the network-based conference. If the user wishes to speak, they may activate a control within the application instance executing on their mobile device. The in-room meeting device may then automatically locate the user, and may direct the camera to pan, tilt, or zoom so that the camera frames the user.

20 Claims, 7 Drawing Sheets

FRAMING AN IMAGE OF A USER REQUESTING TO SPEAK IN A NETWORK-BASED COMMUNICATION SESSION

TECHNICAL FIELD

Embodiments pertain to network-based communication sessions. Some embodiments relate to automated framing of images of a participant of a network-based communication session. Some embodiments relate to automated framing of an image of a participant of the network-based communication session that has indicated a desire to speak.

BACKGROUND

Network-based communication services provide users with the ability to communicate over a network with other users that may be physically remote from their location. Users of the network-based communication services utilize one or more communication applications executing on computing devices that interface with one or more servers of the communication service. In some examples, the communication application passes communications from a first user to server of the communication service that may then forward those communications to one or more communication application instances used by one or more second users. Likewise, communications from the one or more second users may be passed through the servers to the communication application of the first user. In other examples, the communication applications may send communications directly to the other communications applications as peer-to-peer communications. The server in these examples may be used to facilitate the peer-to-peer connection, for example, by providing network addresses of participant devices to setup the peer-to-peer connections.

Example communications that are handled by the network-based communication service may include video, audio, chat, file sharing, and the like. In some examples, users may engage in communication sessions where communications in the session are generated and shared contemporaneously (e.g., real time or near real time). Example such sessions may include voice calls, video calls, network-based meetings, and the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
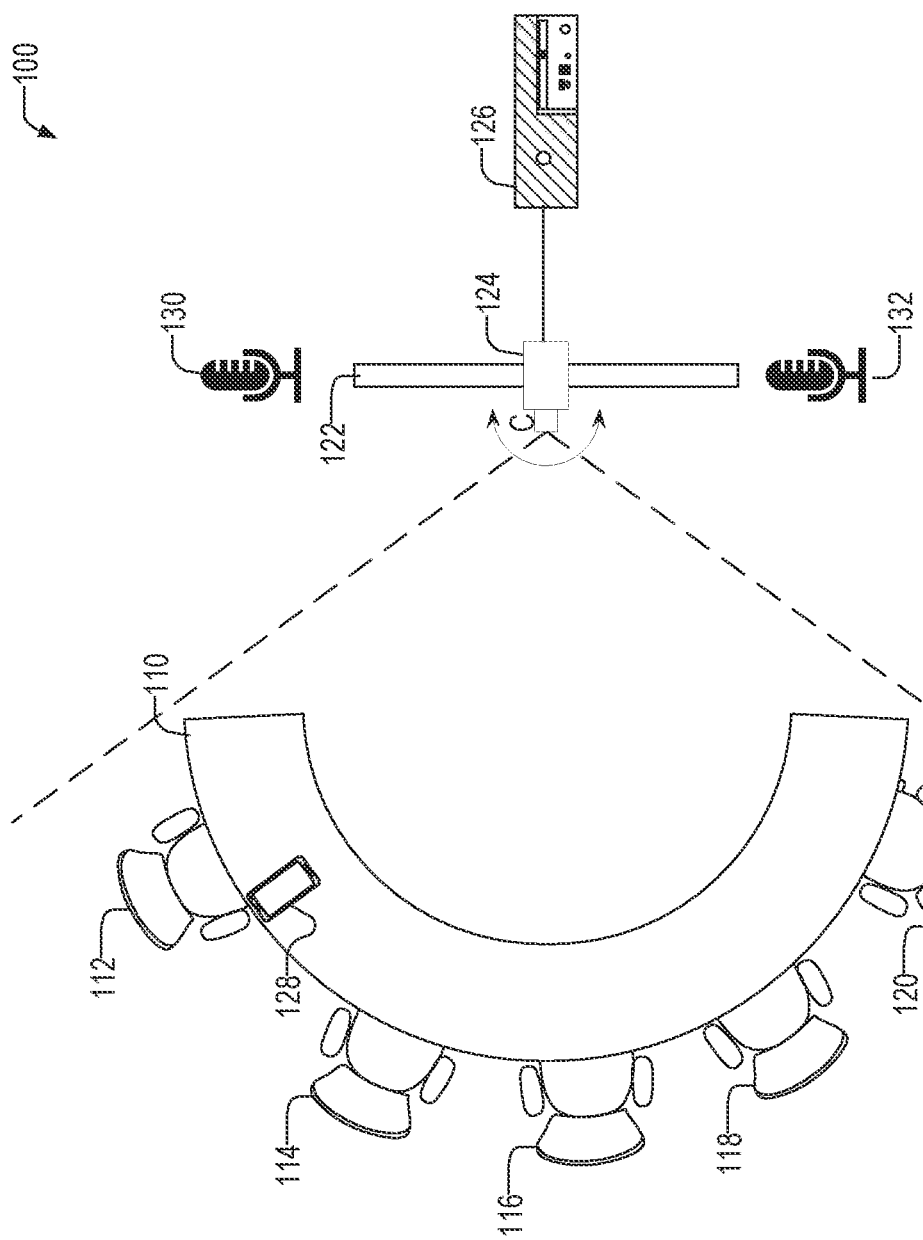
FIG. 1 illustrates an overhead diagram of an example conference room according to some examples of the present disclosure.

One problem that has arisen in network-based conferences is that it may be difficult for certain participants to speak. That is, one or more participants may dominate the conversation and not allow for other participants to interject. One technique that has been used is a button in a GUI of the communication application that allows users to raise a virtual hand. Upon activating the button, a notification is displayed in a user interface of other participants that may identify the user and present an icon (e.g., a raised hand) or other indication that the user wishes to speak. This alerts other participants that someone is waiting to speak and allows the current speaker to yield the floor to the participant wishing to speak.

The use of a button in an application as a means to interject may not be suitable for instances in which users are participating within shared spaces such as conference rooms. In these shared spaces a single computing device executing a communication client instance, along with a single screen and camera, may be used by a group of participants to communicate with other users. In such environments where the communication application services multiple participants, it may not be clear which participant is requesting to speak. Additionally, most conference rooms use one camera placed in a position so that other participants can see the entire room. This makes discerning particular individuals who wish to speak difficult.

Disclosed in some examples, are methods, systems, and machine-readable mediums for allowing participants of communication sessions joining from conference rooms to indicate a desire to speak using their own personal computing device, and, to automatically frame that user with the conference room camera using a position of the user determined automatically. For example, a user may have a communication application executing on their mobile device that is logged into the network-based conference. If the user wishes to speak, they may activate a control within the application instance executing on their mobile device. The application then sends an interjection request signal to the network-based conference service, which may alert other users in the conference that the particular user wishes to speak. The network-based conference service may then signal the in-room meeting device providing the meeting for the conference room informing it that the user wishes to interject. The in-room meeting device may then automatically locate the user, and may direct the camera to pan, tilt, or zoom so that the camera frames the user.

In some examples, the user is framed by one or more of panning, tilting, or zooming the camera to feature the user more prominently. For example, the camera may position the user in the middle of the frame and may zoom in on the user. The pan, tilt, or zoom of the camera may be a physical pan, tilt, or zoom or may be a digital adjustment to the image—such as a digital zoom, pan, or tilt.

The amount of zoom may be preset—e.g., by an administrator when configuring the conference room. For example, each seat in the conference room may be equidistant from the camera such that a static zoom level may appropriately frame the user. In other examples, each seat in the conference room may have a different preset zoom level based upon calculations or experiments during setup of the conference room. The system may then determine, based upon the locations of the conference room, which locations correspond to which seats. When the location of the user is determined, a seat location may also be determined. The seat location may be used to determine one or more of the amount of zoom; an optimal pan; or an optimal tilt position of the camera. These zoom settings may be configured into the communication application of the conference room. In other examples, a bounding box of a person detected at the location of the user may be used such that a prespecified amount of the image is filled with the user.

In some examples, the level of zoom may depend on the reported or determined location of the user or computing device of the user. For example, a distance between the camera and the user may be determined and the distance may be used to set the zoom level. For example, a table with distances and zoom levels may be referenced with the distance between the user and the camera. The table may then output the appropriate zoom level for various possible distances of the user.

Panning and titling may be executed such that the center of the image is positioned on the determined location of the user. For example, the position of the user may be determined within the conference room. The relative position between the camera and the position of the user within the conference room may then be calculated and that relative position may be used to determine a distance (which may be used to set the zoom level) and an angle from the camera where the user is. The angle may then be used to pan the camera toward the user.

As previously described, the framing is accomplished using the determined position of the user. This position may be automatically determined based upon a position of the computing device used by the user. That is, the position of the computing device the user used to indicate their desire to speak may be used as a proxy for the position of the user. For example, upon selecting the control indicating that a user wishes to speak, the computing device of the user may emit an ultrasonic beacon. The conference room computing device may then scan for this beacon in the audio captured for the network-based communication session. The position of the computing device may be determined using the received audio signal for example, by utilizing acoustic source localization techniques such as time distance of arrival and triangulation. For example, the conference room may be equipped with a microphone array, which may provide the sensors needed to position the computing device.

In some examples, the mobile device of the user may send the audio signal responsive to the selection of the control indicating that the user wishes to speak. In addition, the mobile device may send the interjection request to the conference room computing device or the server. The conference room computing device may be continuously listening for the beacon, but in other examples, the conference room computing device may only listen in response to an interjection request.

In some examples, the communication application may filter the detected ultrasonic audio signals out of the audio sent to other participants. This filtering may prevent issues should other participants be utilizing the location system described herein. For example, if a remote participant's ultrasonic signal is played out of a loudspeaker in a remote conference room, the microphone in that conference room may detect that signal and may cause the camera to inadvertently frame an unintended scene in the room based upon where the microphone detects the ultrasonic audio. For example, the audio may bounce back toward the microphone from a point on a wall—and the microphone may detect that point on the wall as the source and frame the point on the wall.

In some examples, each user of the communication session may have a distinct ultrasonic signal. This signal may be chosen or assigned (e.g., by the communication server) when the computing device joins the communication session. The signal profiles of participants in a particular conference room may be sent by the server to the conference room computing device. In these examples, detected ultrasonic signals may, or may not be filtered out. For example, the in-room communication application may only change the camera parameters upon detecting an ultrasonic signal corresponding to a user known to be in the room. In examples in which a unique ultrasonic signal is assigned to each user, the computing devices may periodically broadcast the ultrasonic signal to identify who is in the room for the computing device in the conference room and to allow the conference room computing device to localize those users. The conference room may then display the names of the participants—e.g., below their video images. In other examples, other methods of determine which users are in the room may include using a network address of the mobile device, a registration with the communication service, facial recognition, or the like.

In other examples, the system may determine a location of the computing device of the user based upon a position determined by the computing device. For example, the computing device may utilize a Global Navigation Satellite System (GNSS) such as Global Positioning System (GPS), Wi-fi signals, near field communication signaling, dead reckoning, sensor positioning, or the like to determine its position. This position may then be passed to the in-room computing device of the conference room or to a server of the network-based communication service. In some examples, the position may be directly passed to the in-room device (e.g., embedded in an ultrasonic communication; send using a direct wireless connection, or the like); in other examples, the position may be sent to the network-based communication service (e.g., as part of the "raise hand" indication).

In still other examples, other methods may be used to find the user. For example, the in-room computing device or the network-based communication service may determine, based upon the account that is logged into the application that sent the interjection request, a face of the user. The in-room computing device or the network-based communication service may then analyze the video captured from the conference room using facial recognition to find that user's face. The in-room device may then adjust the camera until the recognized face is framed as noted previously.

Communications and information passed between the computing devices of participants and the in-room communication device of the conference room may be sent directly—e.g., via audio signals, radio frequency signals, or the like—or indirectly through the network-based communication service.

In addition, in some examples, the communication application on the users computing device may automatically launch upon entering the conference room. For example, the conference room computing device may emit an audio signal that may trigger the application to launch and join the communication session. Session join information may also be provided as part of the audio signal to allow the application to immediately join without user intervention. In other examples, the communication application knows that a scheduled meeting is occurring and automatically launches the application and joins the meeting. In still other examples, one or more wireless discovery protocols may be used to cause the communication application of the user's computing device to automatically join the meeting.

The application may recognize it is in a conference room and may launch a modified version of the communication session. For example, it may not join the audio of the session or the video. This may be to prevent feedback in the audio, or unintentional video capture by the user and/or to simplify the interface for the user.

In some examples, the determined position of the user may be used in one or more noise cancellation algorithms to reduce the noise in the room to highlight the speaker's audio.

The disclosed methods herein thus solve the technical problem of communication opportunity denial of service by other communications during a communication session within a conference room through the technical solution of a communication opportunity request notification. In addition, the disclosed methods solve the technical problem of finding, and automatically framing these requesting devices using the technical solution of automated positioning methods. This allows a camera to properly frame a participant of an online conference.

In some examples, the in-room device may continuously track the positions of participants throughout the communication session (e.g., to noise filter audio from the communication session and/or to label users in the video). In other examples, the in-room device locates a participant responsive to receiving an indication that the participant wishes to speak.

FIG. 1 illustrates an overhead diagram of an example conference room 100 according to some examples of the present disclosure. Conference table 110 may have a plurality of seating places 112, 114, 116, 118, and 120 arranged around it. A display 122 may be positioned in front of the table and may be a liquid crystal display (LCD), a light emitting diode (LED) display, a projection screen with a projector (not shown), or the like. The conference room may also have a camera 124. The field of view of the camera is illustrated by the dashed lines. In some examples the camera 124 may have physical pan, tilt, and zoom capabilities that are controlled by software. Microphones 130 and 132 may be individual microphones or part of a microphone array. Microphones 130 and 132 may be positioned in various locations around the room. While two microphones are shown, fewer or greater microphones may be utilized. Microphones 130, 132, display 122, and camera 124 may be communicatively coupled to a conference room computing device 126. Microphones 130 and 132 may be utilized to pick up speech and other audio of participants in the room and send it to other participants in the communication session. In addition, microphones 130 and 132 may pick up one or more ultrasonic signals, e.g., those sent by one or more computing devices, such as mobile device 128.

Conference room computing device 126 may execute an instance of a communication application and may display a GUI of the communication application on the display 122, and playback communications received as part of a communication session on the display 122, and on one or more audio reproduction devices (e.g., speakers) that are not shown. Participants in the communication session in the conference room may bring one or more computing devices of their own, such as mobile device 128 that may also execute an instance of the communication application. The communication application executing on the mobile device 128 may present a GUI on the display of the mobile device 128 and may join a conference taking place in the conference room independently of the conference room computing device 126.

Figure 2:
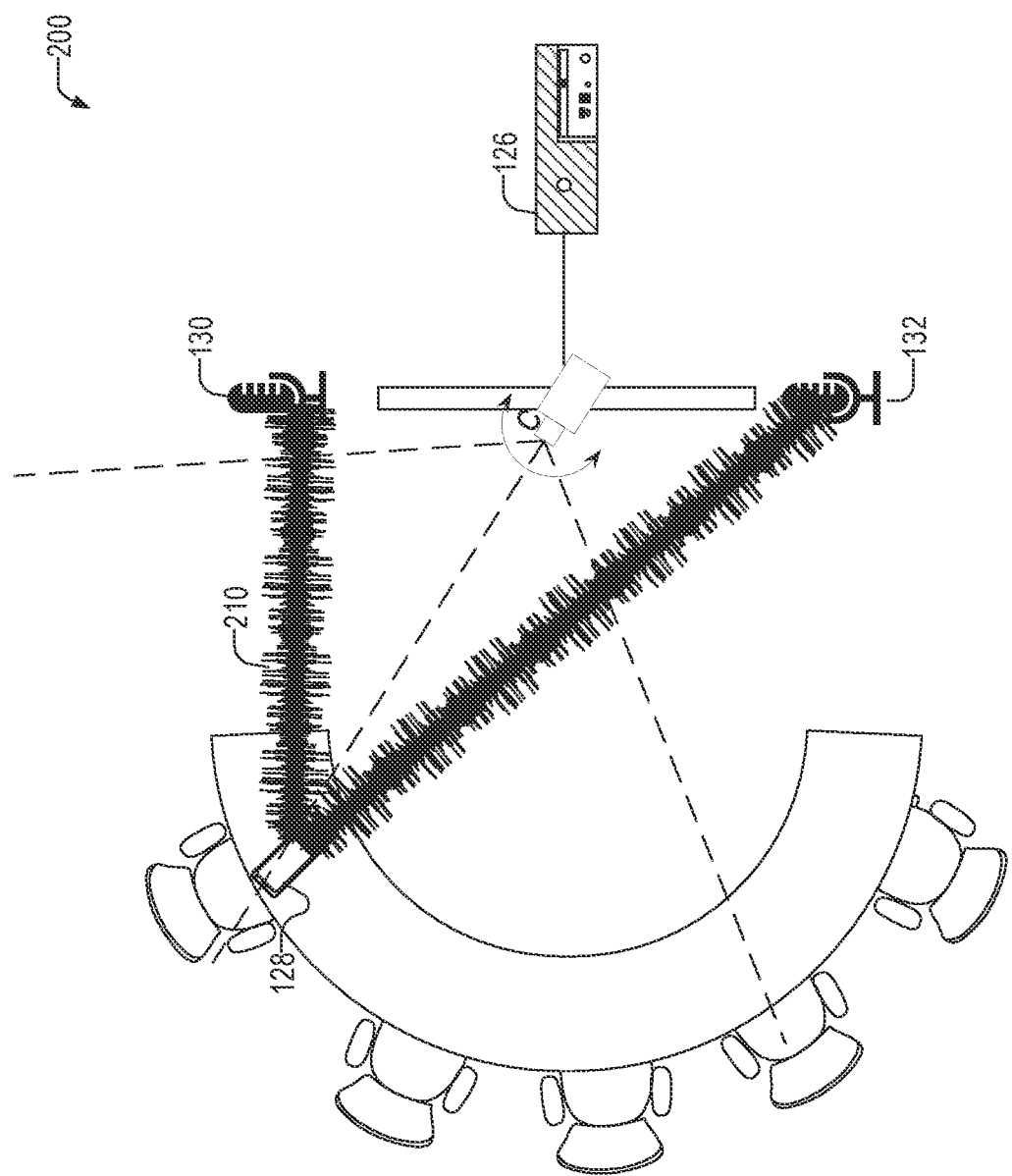
FIG. 2 illustrates an overhead diagram of an example conference room according to some examples of the present disclosure.

FIG. 2 illustrates an overhead diagram of an example conference room 200 according to some examples of the present disclosure. In some examples, the conference room 200 is the same conference room as conference room 100 after a user activates a control indicating they wish to speak. If the user of the mobile device 128 activates a control of the GUI of the communication application indicating that they desire to speak, the mobile device 128 may send an interjection request message to the communication server of the network-based communication service or the conference room computing device 126. The mobile device 128 may then broadcast an ultrasonic signal 210, which may be indetectable to persons in the room, but may be detectable by one or more of the microphones 130, 132. In other examples, the interjection request may be generated by the conference room computing device 126 in response to receiving the ultrasonic signal. That is, the mobile device 128 may only send the ultrasonic signal in response to the selection of the control on the GUI of the communications applications indicating that the user wishes to speak. The conference room computing device 126 may then generate the interjection request on behalf of the mobile device 128 and forward it to the server of the communication service.

The conference room computing device 126 may then calculate a position of the mobile device 128 based upon one or more properties of the received ultrasonic signal, using an algorithm such as, for example, by time difference of arrival, triangulation, or the like. As can be appreciated, the positioning and number of microphones shown in FIGS. 2, and 3 may be varied and the positions and numbers are exemplary only.

Once a relative position of the mobile device 128 is determined, the conference room computing device 126 may determine one or more commands to the camera to frame the user of the mobile device 128. In some examples, to determine the commands, the conference room computing device 126 may determine a relative position of the mobile device 128 to the camera. For example, by panning or tilting the camera so that the determined location is in a center of the captured image, or zooming the location of the mobile device 128 to a specified size. In some examples, the camera may not have the capability to pan, tilt, and/or zoom. Instead, the image determined by the camera may be processed by software to zoom, pan, or tilt. As shown in FIG. 2, the camera has moved to frame the mobile device 128. In some examples one or more servers of the communication service may perform some or all of the functionality described for the conference room computing device 126.

While an ultrasonic signal is shown in FIG. 2 to locate the mobile device 128, in other examples, other methods of locating the mobile device 128 may be used, including RF location methods, facial recognition, and the like. In some examples, the mobile device 128 may determine its location (e.g., using GPS, WIFI signals, or the like) and may report it to the conference room computing device 126.

Figure 3:
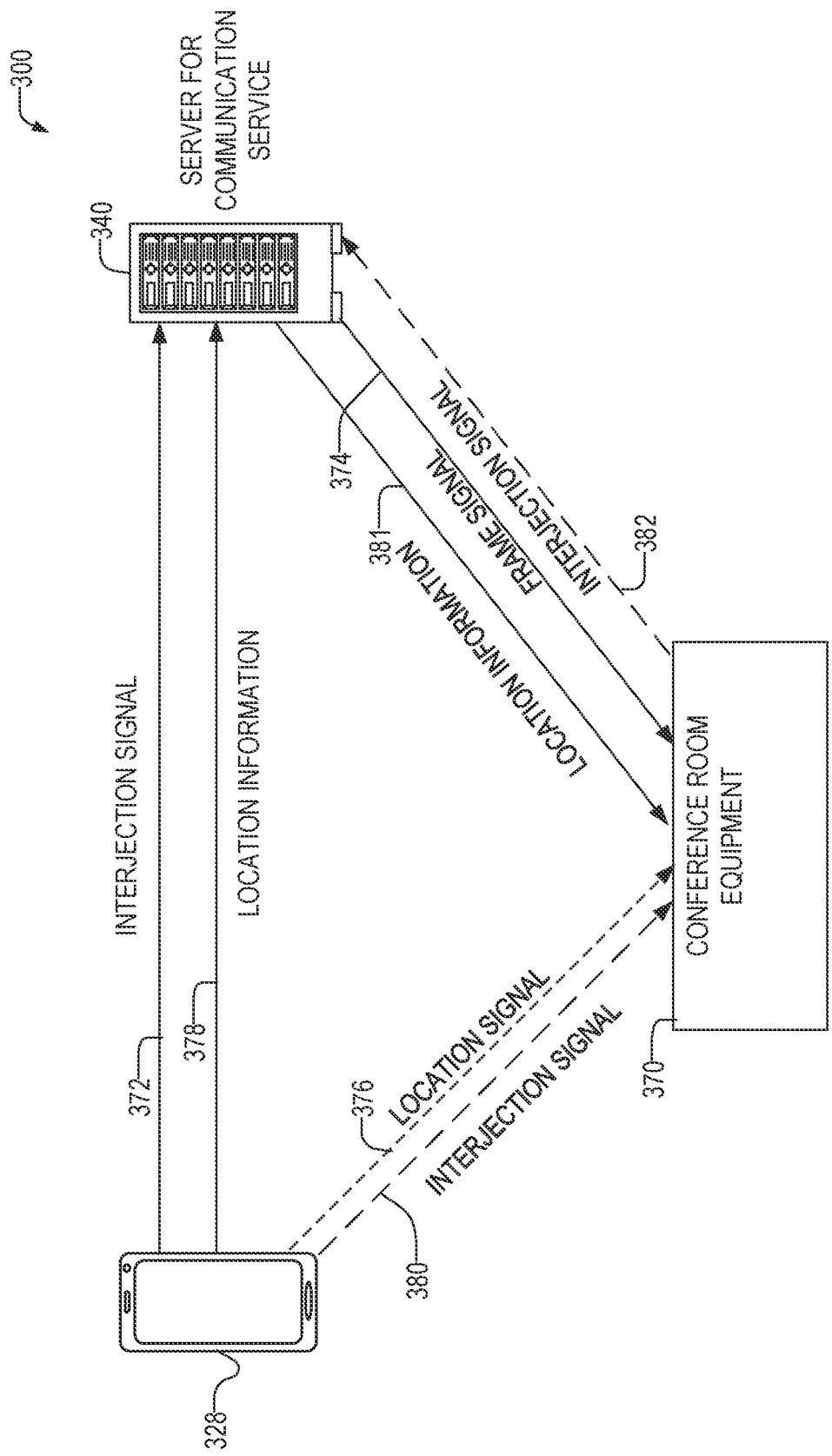
FIG. 3 illustrates a diagram of a message exchange for automatically framing a user wishing to speak in a network-based communication session according to some examples of the present disclosure.

FIG. 3 illustrates a diagram 300 of a message exchange for automatically framing a user wishing to speak in a network-based communication session according to some examples of the present disclosure. The diagram illustrates various examples of message sequences between the computing device of the user, shown in FIG. 3 as mobile device 328, one or more servers for the communication service 340, and the conference room equipment 370. Mobile device 328 may be an example of mobile device 128 from FIGS. 1 and 2. The conference room equipment may be an example of the conference room computing devices 126, 126; microphones 130, 132, display 122, and camera 124 of FIGS. 1 and 2.

In some examples, the user of mobile device 328 may enter the conference room where the conference room equipment 370 is present. The user may manually open the communication application and join the communication session. In some examples, the conference room equipment may broadcast a signal (e.g., an ultrasonic signal, a radio frequency signal, a light signal, or the like) which may be detected by the communication application and may cause the communication to wake up and join the communication session. As previously noted, the signal may include meeting join information such as username and/or password.

If the user of the mobile device 328 wishes to speak, they may activate a control on the GUI of the mobile device 328 which may cause an interjection signal 372 to be sent (e.g., over a network) to the communication server 340. The mobile device 328 may then begin sending a location signal 376—either immediately, or after receiving a response or other command from the communication server 340 or from the conference room equipment 370. The communication server 340 may cause an indication that the user wishes to speak to be displayed within GUIs of other participants. Example indicators may include a hand raised graphic or icon. The server may then send a framing signal 374 to the conference room equipment. In response to the framing signal 374, the conference room equipment may frame a user of the mobile device 328. For example, by listening for a location signal 376 and locating the mobile device 328.

Listening for the location signal 376 may be done in response to receipt of the framing signal 374, or the conference room equipment may continuously or periodically scan for the location signal 376 and thus may already know where the mobile device 328 is located and may thus proceed with framing. As noted, location signal 376 may be an audio signal, an RF signal, visual light (used with facial recognition), and the like. In still other examples, the location signal 376 may be a location determined by the mobile device 328—e.g., via GPS.

In other examples, the location information may be sent to the server using message 378. For example, the mobile device 328 may determine its own location and send that location to the communication server 340, which may then forward that location with message 381. Once a location of the mobile device 328 is determined the conference room equipment 370 may cause the camera to frame the location of the mobile device 328 and thus the user of the mobile device 328.

In some examples, the interjection signal may be sent from the mobile device 328 directly to the conference room equipment 370. The conference room equipment 370 may then scan for the location signal 376 and provide the interjection signal 382 to the communication server 340 for display to other communication participants. In some examples, the interjection signal 380 may be a same signal as the location signal 376. That is, the conference room equipment 370 may monitor for location signals continuously and receipt of a location signal is construed as a request to send the interjection signal on behalf of the computing device that sent the location signal. In some examples, the location signals have an identifier of the user of the computing device (e.g., the account that is logged into the communication service via the communication application) which may be determined by the conference room equipment 370 and forwarded to the server.

In some examples, the location of the mobile device 328 and the adjustments to the camera may be determined by the communication server 340. For physical camera adjustments the communication server 340 may send the adjustments to the conference room equipment 370. For digital image adjustments such as digital zoom, and the like, in some examples, the communication server 340 may command the conference room equipment 370 to perform those adjustments, but in other examples, the communication server 340 may do the adjustments on video received by the conference room equipment 370.

Figure 4:
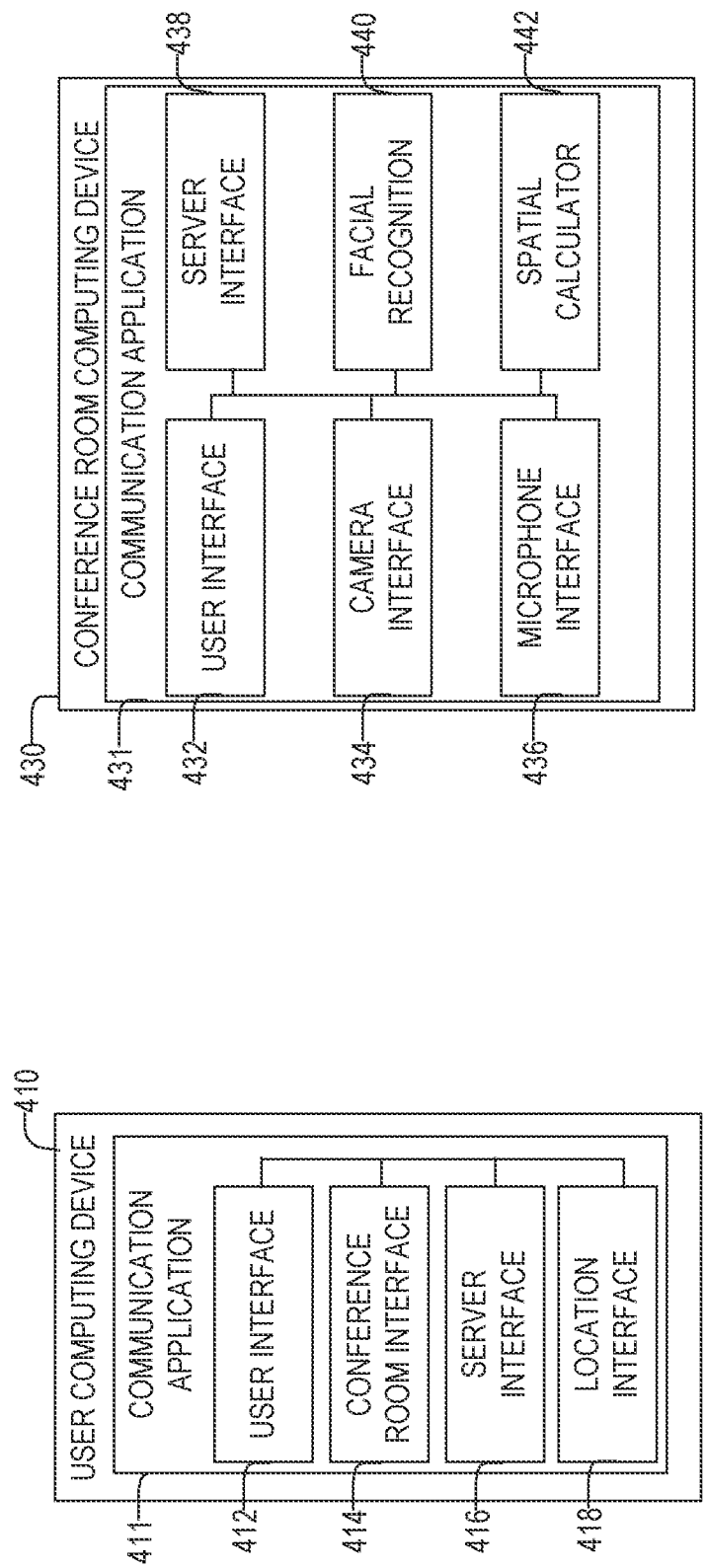
FIG. 4 illustrates a logical diagram of a user computing device and a conference room computing device according to some examples of the present disclosure.

FIG. 4 illustrates a logical diagram of a user computing device 410 and a conference room computing device 430 according to some examples of the present disclosure. The components of FIG. 4 may be implemented by configuring one or more hardware devices using software. User computing device 410 may execute a communication application 411. Communication application 411 may, in conjunction with one or more servers of the communication service, provide one or more communications such as audio and video communications, network-based meetings, chat communications, file sharing, and the like including communication sessions with one or more other computing devices, either by communicating directly with those devices or indirectly through a server of the communication service. Communication application 411 may include components not shown in FIG. 4 to facilitate such communication sessions.

Communication application 411 may include a user interface component 412 for displaying one or more graphical user interfaces (GUIs) for experiencing, controlling, and interacting with the communication service and the communications. For example, received communications may be displayed through the user interface, which may include audio reproduction device interfaces. In addition, the user may adjust one or more parameters of the communication service in the GUIs, join communication sessions, leave communication sessions, setup communication sessions, invite other participants to communication sessions, control the communication sessions in the GUIs, and the like.

User interface component 412 may also include one or more controls for allowing the user to indicate that they wish to speak during a communication session. The user interface component 412 may then interface with the server interface 416 or the conference room interface 414 to send an interjection request message upon activation of the control to either of the server or the conference room computing device, depending on the implementation.

Conference room interface 414 may communicate with the conference room device, e.g., through RF, ultrasonic signals, and the like. For example, by transmitting an interjection request to the conference room device, a location information beacon, and the like. The location information beacon may be used by the conference room device to locate the user computing device 410.

In other examples, the location interface 418 may determine a location of the user computing device 410 by interfacing with one or more sensors of the device, e.g., such as using one or more operating system calls to an operating system executing on the user computing device 410. This location may be sent to the conference room device directly through the conference room interface 414, or indirectly through the server interface 416. Server interface 416 may interface with a server of the communication service to send and receive communications, parameters, and the like. In addition, server interface 416 may interface with a server of the network-based communication service to send interjection requests, location information, and/or the like depending on the implementation.

Conference room computing device 430 may execute a communication application 431. Communication application 431 may be another instance of communication application 411 or may be a different version of the communication application customized for operation in conference rooms. Communication application 431 may include a user interface component 432, server interface component 438, camera interface component 434, microphone interface component 436, spatial calculator component 442, and facial recognition component 440.

Communication application 431 may, in conjunction with one or more servers of a communication service, provide one or more communications such as audio and video communications, network-based meetings, chat communications, file sharing, and the like including communication sessions with one or more other computing devices, either by communicating directly with those devices or indirectly through a server of the communication service. Communication application 431 may include components not shown in FIG. 4 to facilitate such communication sessions.

Communication application 431 may include a user interface component 432 for displaying one or more graphical user interfaces (GUIs) for experiencing, controlling, and interacting with the communication service. For example, received communications may be displayed through the user interface, which may include audio reproduction device interfaces. The user interface may be displayed on a display coupled to the conference room computing device 430, such as display 122. In addition, users may adjust one or more parameters of the communication service in the GUIs, join communication sessions, leave communication sessions, setup communication sessions, invite other participants to communication sessions, control the communication sessions in the GUIs, and the like. User interface component 432 may also include one or more controls for allowing the user to indicate that they wish to speak during a communication session.

Server interface component 438 may interface with a server of the communication service to send and receive communications, parameters, and the like. In addition, server interface component 438 may receive location information in some examples for devices from the server; frame signals from the server; and in some examples may send an interjection signal upon receipt of an interjection signal directly sent from the user computing device 410 to the conference room equipment.

Camera interface component 434 may interface with a camera to cause the camera to pan, tilt, zoom, or otherwise control the camera. Microphone interface 436 component may control one or more microphones to adjust volume and other parameters. Spatial calculator component 442 may calculate a position of the user computing device 410 based upon signals sent by the mobile device. Spatial calculator component 442 may also calculate a relative position of the user computing device 410 to a camera communicatively coupled to the conference room computing device 430. Camera interface component 434 may then utilize the determined position—calculated by the spatial calculator component 442 or may utilize the location information sent by the server or the mobile device to calculate a pan, tilt, or zoom to frame the user and may then cause the camera to apply the calculated pan, tilt, or zoom. In other examples, the camera interface component 434 may digitally pan, tilt, or zoom by processing the image from the camera.

In some examples, one or more of the components of the conference room computing device 430, such as, for example, the facial recognition component 440, spatial calculator component 442, or the like may be performed by a server of the communication service. For example, information about the location of the user computing device 410, such as properties of a detected audio signal may be sent to the server, which may locate the user computing device 410, calculate adjustments to the camera, and send those adjustments to the conference room computing device 430.

Facial recognition component 440 may determine a position of the user based upon a recognized face of the user in some examples. In some other examples, the conference room computing device may determine a rough estimate of the position of the user based upon ultrasonic signals or the positioning given by the user computing device 410 and then use facial recognition to obtain a fine-grained determination of the user's location.

Figure 5:
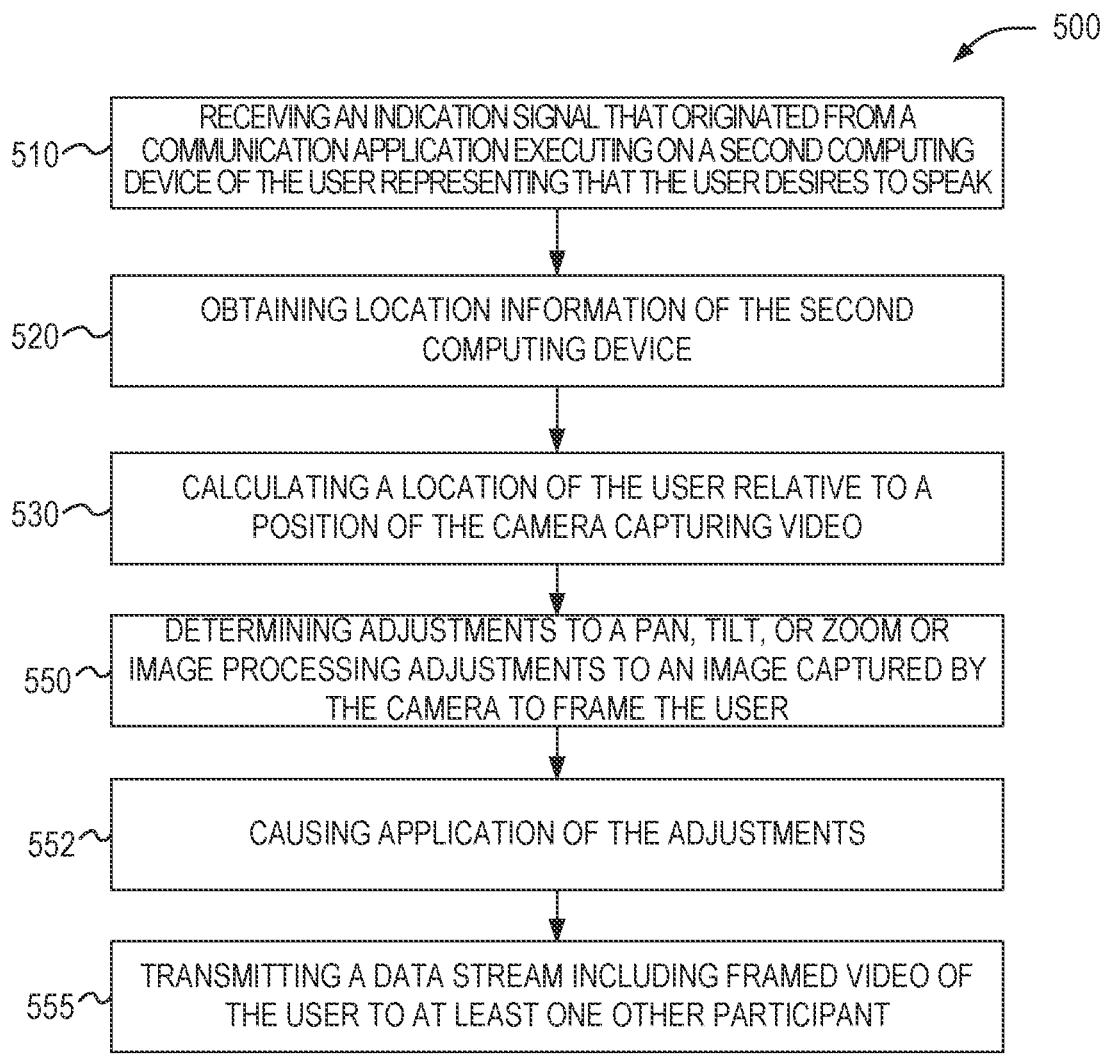
FIG. 5 illustrates a flowchart of a method of automatically framing an image of a user requesting to speak in a network-based communication session according to some examples of the present disclosure.

FIG. 5 illustrates a flowchart 500 of a method of automatically framing an image of a user requesting to speak in a network-based communication session according to some examples of the present disclosure. In some examples, the method may be performed by a first computing device. The first computing device in some examples may be the conference room computing device, such as conference room computing device 430 and 126. In other examples, the first computing device may be a server of the communication service (e.g., communication server 340).

At operation 510, the computing device may receive an indication signal that originated from a communication application executing on a second computing device of the user, the signal representing that the user desires to speak in the network-based communication session. For example, a user of the second computing device may select a control of a GUI displayed on a display device of the second computing device, the control selection may indicate that the user desires to speak. Responsive to this selection of the control, the second computing device may send a signal directly to the conference room computing device or may send a signal to a server of the communication service. In the latter examples, the server may then forward a signal (e.g., a frame signal) to the conference room computing device. In instances in which the signal is directly sent to the conference room computing device, the conference room computing device may forward the signal to the server of the communication service.

In some examples, the signal sent directly by the computing device to the conference room computing device may be a message sent over a network, an RF signal, an audio signal, or the like. The signal may also be a same signal used to obtain a location of the second computing device. Once the user selects the control, the indication that the user desires to speak may be displayed on one or more GUIs of other participants. For example, an icon or other graphical or textual indication may be displayed.

At operation 520, the computing device may obtain location information of the second computing device. In some examples the location information may be a calculated location of the second computing device, a location sent by the second computing device, or an audio signal sent by the second computing device and detected by a microphone coupled to the first computing device.

For example, the location information may be an audio signal sent by the second computing device and used by the first computing device to calculate the position of the second computing device. The position calculation based upon the audio signals may be performed on the conference room communication device. In examples in which the server computing device is performing the operations of FIG. 5, the position information may be sent to the server from the conference room device and may be information about the received audio signal that is used to calculate the location of the second computing device. For example, characteristics of the audio signal received.

In some examples the location information may be provided by the second computing device, either to the server or the conference room computing device. In the examples in which the location information is provided by the second computing device, and where the first computing device is the conference room device, the location information may be provided to the first computing device directly, or through the server. In the examples in which the location information is provided by the second computing device, and where the first computing device is the server, the location information may be provided to the first computing device directly, or through the conference room device.

In some examples, one or more other computing devices may provide a location of the second computing device, such as a computing device of cellular carriers, WiFi positioning devices, and the like. This location information may be provided to the server or conference room device by these devices, the second computing device, or the like.

At operation 530, the first computing device may calculate a location of the user relative to a position of a camera capturing video for the network-based communication session based upon the location information of the second computing device. The position of the second computing device may be used as the position of the user. The position of the second computing device may then be determined relative to the camera. For example, while the position of the user may have been determined by microphones, those microphones may be in a different position from the camera.

In some examples, the position of the camera is known (e.g., it is configured during a setup operation). The position of the camera may thus be determined and a relative location may be determined by comparing both the position of the camera and the position of the second computing device. For example, a distance, an angle, or the like may be computed. In examples in which the audio provides distances and angles—e.g., a relative position to the microphones, the distances and angles may be adjusted to be from a position of the camera rather than the microphone. In examples in which global positions are determined, the relative position may be a distance and angle calculated using trigonometric functions.

At operation 550, the first computing device may determine, using the calculated location of the user relative to the position of the camera, adjustments to a pan, tilt, or zoom of the camera or image processing adjustments to an image captured by the camera to frame the user. For example, the adjustments may increase a size of the image of the user captured by the camera, center the user within the image, or both. The adjustments may be to a physical pan, tilt, or zoom of the camera; or may be digital adjustments such as cropping, zooming, or the like. The adjustments may be determined using the relative location determined from operation 530. In some examples, the zoom is based upon a calculated distance. For example, the greater the calculated distance between the camera and the second computing device, the greater the level of zoom that may be applied. In some examples, the pan or tilt may be calculated based upon an angle between the position of the camera and the second computing device.

At operation 552, the first computing device may cause application of the adjustments. For example, by causing the camera to move and/or zoom in the determined way through an interface such as a Universal Serial Bus (USB); Peripheral Component Interconnect (PCI) or PCI express (PCIe); or the like. In some examples, where method is performed by the server, the server may request the application of the adjustments from the conference room computing device. For digital adjustments to the image, either the conference room computing device or the server may apply those adjustments using one or more filters, such as by cropping and scaling the image. At operation 555 the system may transmit a data stream including the framed video of the user to at least one other participant.

Note that in some examples, the system may wait to frame the user until the interjection request is accepted by a participant in the conference, such as a moderator or leader. For example, the interjection request may display a hand raised icon on a GUI of the network-based communication session. A participant, such as a moderator, may then activate a control on their GUI to give the requesting user the floor to allow them to speak. In some examples, the server sends the notification to the conference room computing device (e.g., operation 510) only after the moderator (or other participant) has agreed to give the requesting user the floor. In other examples, the conference room computing device, upon identifying that the user desires to speak in operation 510, analyzes the audio of the conference and detects a silence that is greater than a threshold duration. Once the silence is detected, the conference room computing device may proceed to frame the user.

Figure 6:
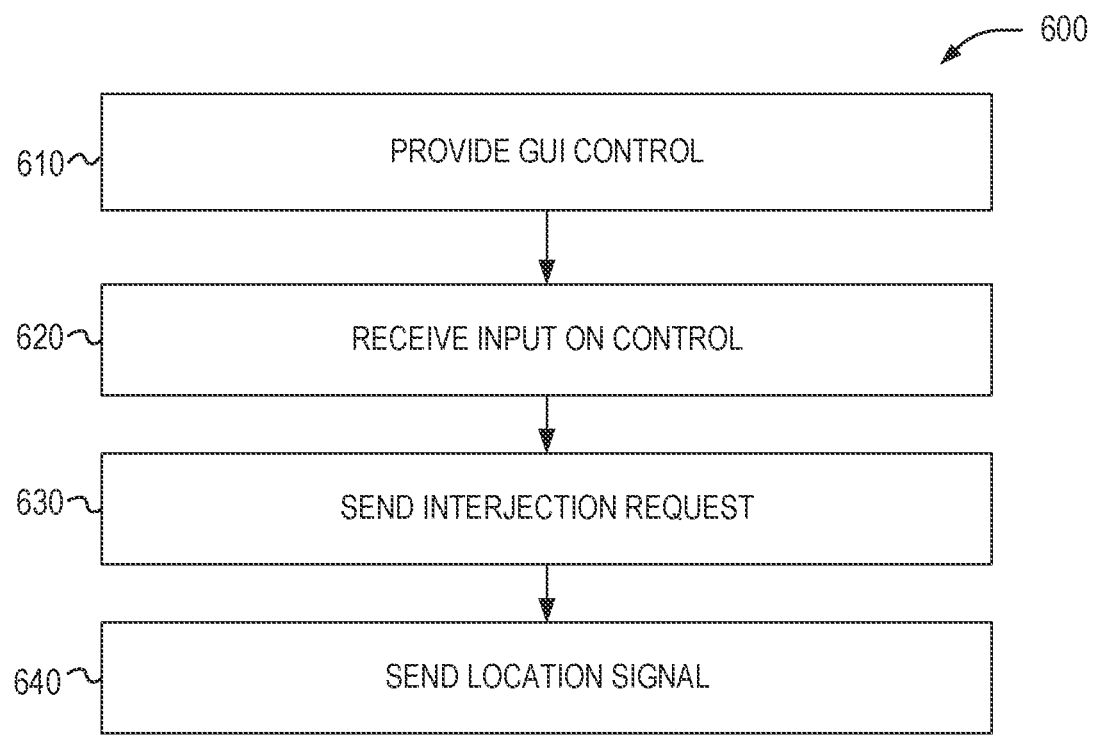
FIG. 6 illustrates a flowchart of a method performed by a user computing device requesting to speak according to some examples of the present disclosure.

FIG. 6 illustrates a flowchart of a method 600 performed by a user computing device requesting to speak according to some examples of the present disclosure. In some examples, the method 600 may be performed by a communication application. At operation 610 the computing device may provide a GUI control for indicating that user wishes to speak. The control may be a physical button, a touchscreen button, a clickable button, a soft-key, or the like. In other examples, the control may be other GUI input elements. At operation 620, the application receives an input on the control indicating the user wishes to speak. For example, an indication that the user has activated the button or other control.

At operation 630 an interjection request may be sent to a conference room computing device or a server. Whether the request is sent to a conference room computing device or the server may depend on a configuration, or a network status of the user computing device. For example, if the user computing device does not have a network connection, but both the user computing device and the conference room computing device support peer-to-peer connections, the interjection request may be sent to the conference room device and then forwarded to the server by the conference room device.

At operation 640, the user computing device may send the location signal. For example, an audio signal, a message with a location, or the like. In some examples, the interjection request sent at operation 630 and the location signal are sent as a same signal or message. That is, the audio signal may serve as both a location request and interjection signal.

In some examples, the system may utilize facial detection or recognition to recognize a location of the user. The conference room computing device or server may analyze video captured by the camera and recognize faces in the video. The recognized faces may then be compared to biometric template data of faces for participants in the communication session that have asked to speak. If a match is found, the camera may be zoomed or panned to the recognized face. Example recognition algorithms may include principal component analysis using eigenfaces, linear discriminant analysis, hidden Markov models, and the like.

Figure 7:
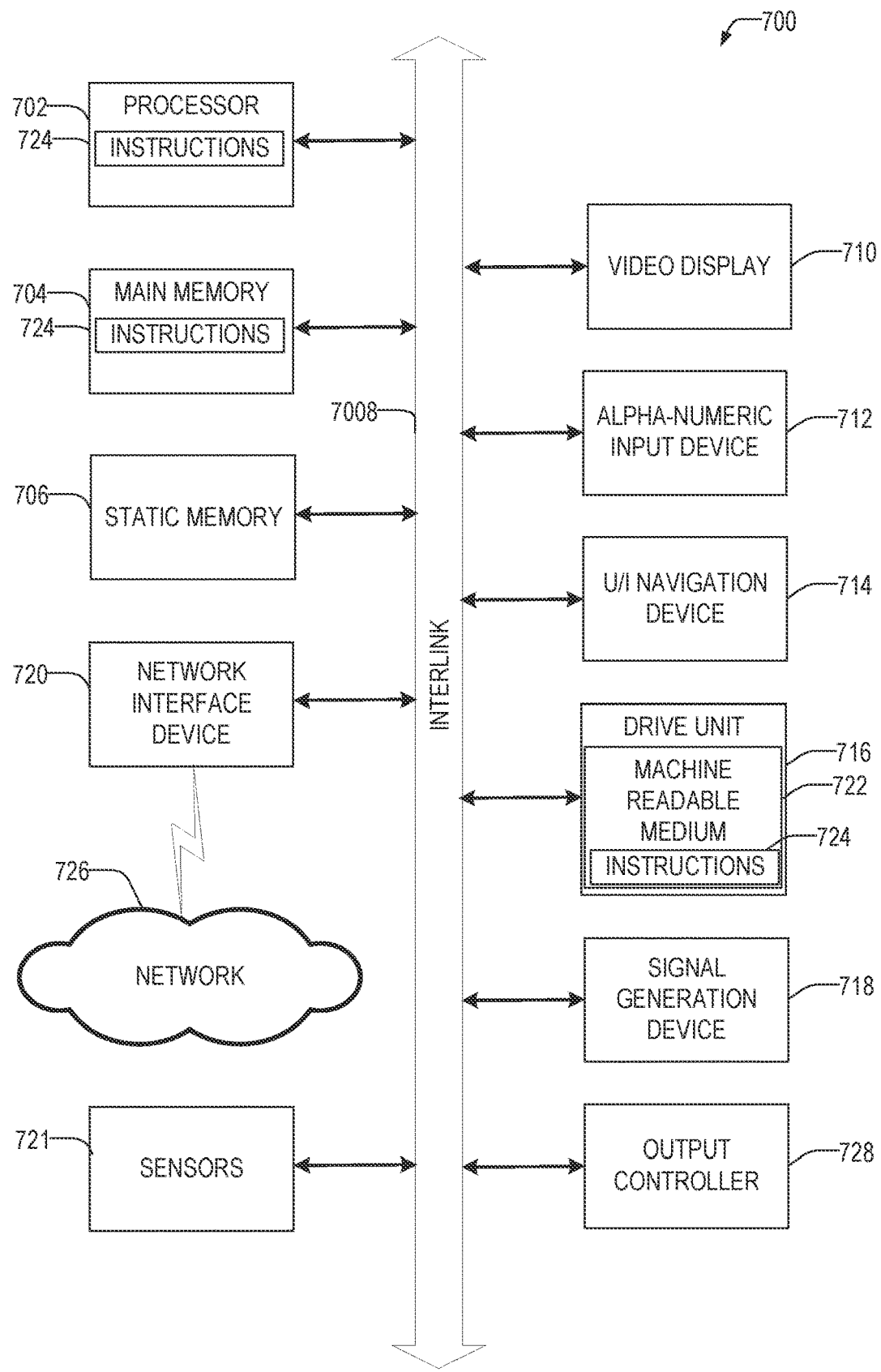
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 700 may implement the conference room computing device 126, 126, 430, the conference room equipment 370; user computing device 128, 128, 328, 410; and/or communication server 340 for the communication service. Machine 700 may implement the components of FIG. 4; and the method of FIGS. 5 and 6. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 700 may include one or more hardware processors, such as processor 702. Processor 702 may be a central processing unit (CPU), a graphics processing unit (GPU), a hardware processor core, or any combination thereof. Machine 700 may include a main memory 704 and a static memory 706, some or all of which may communicate with each other via an interlink (e.g., bus) 708. Examples of main memory 704 may include Synchronous Dynamic Random-Access Memory (SDRAM), such as Double Data Rate memory, such as DDR4 or DDR5. Interlink 708 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 724 may further be transmitted or received over a communications network 726 using a transmission medium via the network interface device 720. The Machine 700 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques.

OTHER NOTES AND EXAMPLES

Example 1 is a computing device for automatically framing an image of a user requesting, via a second computing device, to speak in a network-based communication session, the computing device comprising: a processor; a memory, the memory storing instructions, which when executed by the processor, cause the processor to perform operations comprising: receiving an indication signal originated from a communication application executing on the second computing device of the user representing that the user desires to speak in the network-based communication session; responsive to the received indication signal: obtaining location information of the second computing device, wherein the location information is a calculated location of the second computing device, a location sent by the second computing device, or an audio signal sent by the second computing device and detected by a microphone coupled to the computing device; calculating a location of the user relative to a position of a camera capturing video for the network-based communication session based upon the location information of the second computing device; determining, using the calculated location of the user relative to the position of the camera, adjustments to a pan, tilt, or zoom of the camera or image processing adjustments to an image captured by the camera to frame the user by one or more of: increase a size of the image of the user captured by the camera or center the user within the image; causing the adjustments to the pan, tilt, or zoom of the camera to be applied or causing the image processing adjustments to be applied; and transmitting a data stream including framed video of the user to at least one other participant.

In Example 2, the subject matter of Example 1 includes, wherein the indication signal is a message sent by the second computing device directly to the computing device.

In Example 3, the subject matter of Examples 1-2 includes, wherein the indication signal and the location information are in a same signal.

In Example 4, the subject matter of Examples 1-3 includes, wherein the audio signal is an ultrasonic signal, and wherein the operations of calculating the location of the user relative to a position of the camera capturing video for the network-based communication session comprises using one of: time difference of arrival or triangulation.

In Example 5, the subject matter of Examples 1-4 includes, wherein the microphone is a microphone array.

In Example 6, the subject matter of Examples 1-5 includes, wherein the operations further comprising identifying an indication that a host of the network-based communication session has recognized the user prior to framing the user.

In Example 7, the subject matter of Examples 1-6 includes, wherein the image processing adjustments comprises a digital pan, digital tilt, or digital zoom.

Example 8 is a method performed by a first computing device for automatically framing an image of a user requesting, via a second computing device, to speak in a network-based communication session, the method comprising: using a processor of the first computing device: receiving an indication signal originated from a communication application executing on the second computing device of the user representing that the user desires to speak in the network-based communication session; responsive to the received indication signal: obtaining location information of the second computing device, wherein the location information is a calculated location of the second computing device, a location sent by the second computing device, or an audio signal sent by the second computing device and detected by a microphone coupled to the first computing device; calculating a location of the user relative to a position of a camera capturing video for the network-based communication session based upon the location information of the second computing device; determining, using the calculated location of the user relative to the position of the camera, adjustments to a pan, tilt, or zoom of the camera or image processing adjustments to an image captured by the camera to frame the user by one or more of: increase a size of the image of the user captured by the camera or center the user within the image; causing the adjustments to the pan, tilt, or zoom of the camera to be applied or causing the image processing adjustments to be applied; and transmitting a data stream including framed video of the user to at least one other participant.

In Example 9, the subject matter of Example 8 includes, wherein the indication signal is a message sent by the second computing device directly to the first computing device.

In Example 10, the subject matter of Examples 8-9 includes, wherein the indication signal and the location information are in a same signal.

In Example 11, the subject matter of Examples 8-10 includes, wherein the audio signal is an ultrasonic signal, and wherein calculating the location of the user relative to a position of the camera capturing video for the network-based communication session comprises using one of: time difference of arrival or triangulation.

In Example 12, the subject matter of Examples 8-11 includes, wherein the microphone is a microphone array.

In Example 13, the subject matter of Examples 8-12 includes, identifying an indication that a host of the network-based communication session has recognized the user prior to framing the user.

In Example 14, the subject matter of Examples 8-13 includes, wherein the image processing adjustments comprises a digital pan, digital tilt, or digital zoom.

Example 15 is a machine-readable medium, storing instructions for automatically framing an image of a user requesting, via a second computing device, to speak in a network-based communication session, the instructions, when executed by a computing device, cause the computing device to perform operations comprising: receiving an indication signal originated from a communication application executing on the second computing device of the user representing that the user desires to speak in the network-based communication session; responsive to the received indication signal: obtaining location information of the second computing device, wherein the location information is a calculated location of the second computing device, a location sent by the second computing device, or an audio signal sent by the second computing device and detected by a microphone coupled to the computing device; calculating a location of the user relative to a position of a camera capturing video for the network-based communication session based upon the location information of the second computing device; determining, using the calculated location of the user relative to the position of the camera, adjustments to a pan, tilt, or zoom of the camera or image processing adjustments to an image captured by the camera to frame the user by one or more of: increase a size of the image of the user captured by the camera or center the user within the image; causing the adjustments to the pan, tilt, or zoom of the camera to be applied or causing the image processing adjustments to be applied; and transmitting a data stream including framed video of the user to at least one other participant.

In Example 16, the subject matter of Example 15 includes, wherein the indication signal is a message sent by the second computing device directly to the computing device.

In Example 17, the subject matter of Examples 15-16 includes, wherein the indication signal and the location information are in a same signal.

In Example 18, the subject matter of Examples 15-17 includes, wherein the audio signal is an ultrasonic signal, and wherein the operations of calculating the location of the user relative to a position of the camera capturing video for the network-based communication session comprises using one of: time difference of arrival or triangulation.

In Example 19, the subject matter of Examples 15-18 includes, wherein the microphone is a microphone array.

In Example 20, the subject matter of Examples 15-19 includes, wherein the operations further comprising identifying an indication that a host of the network-based communication session has recognized the user prior to framing the user.

In Example 21, the subject matter of Examples 15-20 includes, wherein the image processing adjustments comprises a digital pan, digital tilt, or digital zoom.

Example 22 is a computing device for automatically framing an image of a user requesting, via a second computing device, to speak in a network-based communication session, the computing device comprising: means for receiving an indication signal originated from a communication application executing on the second computing device of the user representing that the user desires to speak in the network-based communication session; responsive to the received indication signal: means for obtaining location information of the second computing device, wherein the location information is a calculated location of the second computing device, a location sent by the second computing device, or an audio signal sent by the second computing device and detected by a microphone coupled to the computing device; means for calculating a location of the user relative to a position of a camera capturing video for the network-based communication session based upon the location information of the second computing device; means for determining, using the calculated location of the user relative to the position of the camera, adjustments to a pan, tilt, or zoom of the camera or image processing adjustments to an image captured by the camera to frame the user by one or more of: increase a size of the image of the user captured by the camera or center the user within the image; causing the adjustments to the pan, tilt, or zoom of the camera to be applied or causing the image processing adjustments to be applied; and means for transmitting a data stream including framed video of the user to at least one other participant.

In Example 23, the subject matter of Example 22 includes, wherein the indication signal is a message sent by the second computing device directly to the computing device.

In Example 24, the subject matter of Examples 22-23 includes, wherein the indication signal and the location information are in a same signal.

In Example 25, the subject matter of Examples 22-24 includes, wherein the audio signal is an ultrasonic signal, and wherein the means for calculating the location of the user relative to a position of a camera capturing video for the network-based communication session comprises using one of: time difference of arrival or triangulation.

In Example 26, the subject matter of Examples 22-25 includes, wherein the microphone is a microphone array.

In Example 27, the subject matter of Examples 22-26 includes, means for identifying an indication that a host of the network-based communication session has recognized the user prior to framing the user.

In Example 28, the subject matter of Examples 22-27 includes, wherein the image processing adjustments comprises a digital pan, digital tilt, or digital zoom.

Example 29 is at least one machine-readable medium including instructions that, when executed by processing circuitry, cause the processing circuitry to perform operations to implement of any of Examples 1-28.

Example 30 is an apparatus comprising means to implement of any of Examples 1-28.

Example 31 is a system to implement of any of Examples 1-28.

Example 32 is a method to implement of any of Examples 1-28.

What is claimed is:

1. A computing device for automatically framing an image of a user requesting, via a second computing device, to speak in a network-based communication session, the computing device comprising:
   a processor;
   a memory, the memory storing instructions, which when executed by the processor, cause the processor to perform operations comprising:

receiving an indication signal originated from a communication application executing on the second computing device of the user representing that the user desires to speak in the network-based communication session;

responsive to the received indication signal:

obtaining location information of the second computing device, wherein the location information is a calculated location of the second computing device, a location sent by the second computing device, or an ultrasonic audio signal sent by the second computing device and detected by a microphone coupled to the computing device;

calculating a location of the user relative to a position of a camera capturing video for the network-based communication session based upon the location information of the second computing device;

determining, using the calculated location of the user relative to the position of the camera, adjustments to a pan, tilt, or zoom of the camera or image processing adjustments to an image captured by the camera to frame the user by one or more of: increase a size of the image of the user captured by the camera or center the user within the image;

causing the adjustments to the pan, tilt, or zoom of the camera to be applied or causing the image processing adjustments to be applied; and transmitting a data stream including framed video of the user to at least one other participant.

2. The computing device of claim 1, wherein the indication signal is a message sent by the second computing device directly to the computing device.

3. The computing device of claim 1, wherein the indication signal and the location information are in a same signal.

4. The computing device of claim 1, wherein the operations of calculating the location of the user relative to a position of the camera capturing video for the network-based communication session comprises using one of: time difference of arrival or triangulation.

5. The computing device of claim 1, wherein the microphone is a microphone array.

6. The computing device of claim 1, wherein the operations further comprising identifying an indication that a host of the network-based communication session has recognized the user prior to framing the user.

7. The computing device of claim 1, wherein the image processing adjustments comprises a digital pan, digital tilt, or digital zoom.

8. A method performed by a first computing device for automatically framing an image of a user requesting, via a second computing device, to speak in a network-based communication session, the method comprising:

using a processor of the first computing device:

receiving an indication signal originated from a communication application executing on the second computing device of the user representing that the user desires to speak in the network-based communication session;

responsive to the received indication signal:

obtaining location information of the second computing device, wherein the location information is a calculated location of the second computing device, a location sent by the second computing device, or an ultrasonic audio signal sent by the second computing device and detected by a microphone coupled to the first computing device;

calculating a location of the user relative to a position of a camera capturing video for the network-based communication session based upon the location information of the second computing device;

determining, using the calculated location of the user relative to the position of the camera, adjustments to a pan, tilt, or zoom of the camera or image processing adjustments to an image captured by the camera to frame the user by one or more of: increase a size of the image of the user captured by the camera or center the user within the image;

causing the adjustments to the pan, tilt, or zoom of the camera to be applied or causing the image processing adjustments to be applied; and transmitting a data stream including framed video of the user to at least one other participant.

9. The method of claim 8, wherein the indication signal is a message sent by the second computing device directly to the first computing device.

10. The method of claim 8, wherein the indication signal and the location information are in a same signal.

11. The method of claim 8, wherein calculating the location of the user relative to a position of the camera capturing video for the network-based communication session comprises using one of:

time difference of arrival or triangulation.

12. The method of claim 8, wherein the microphone is a microphone array.

13. The method of claim 8, further comprising identifying an indication that a host of the network-based communication session has recognized the user prior to framing the user.

14. The method of claim 8, wherein the image processing adjustments comprises a digital pan, digital tilt, or digital zoom.

15. A computing device for automatically framing an image of a user requesting, via a second computing device, to speak in a network-based communication session, the computing device comprising:

means for receiving an indication signal originated from a communication application executing on the second computing device of the user representing that the user desires to speak in the network-based communication session;

responsive to the received indication signal:

means for obtaining location information of the second computing device, wherein the location information is a calculated location of the second computing device, a location sent by the second computing device, or an ultrasonic audio signal sent by the second computing device and detected by a microphone coupled to the computing device;

means for calculating a location of the user relative to a position of a camera capturing video for the network-based communication session based upon the location information of the second computing device;

means for determining, using the calculated location of the user relative to the position of the camera, adjustments to a pan, tilt, or zoom of the camera or image processing adjustments to an image captured by the camera to frame the user by one or more of: increase a size of the image of the user captured by the camera or center the user within the image;

causing the adjustments to the pan, tilt, or zoom of the camera to be applied or causing the image processing adjustments to be applied; and means for transmitting a data stream including framed video of the user to at least one other participant.

16. The computing device of claim 15, wherein the indication signal is a message sent by the second computing device directly to the computing device.

17. The computing device of claim 15, wherein the indication signal and the location information are in a same signal.

18. The computing device of claim 15, wherein the means for calculating the location of the user relative to a position of a camera capturing video for the network-based communication session comprises using one of: time difference of arrival or triangulation.

19. The computing device of claim 15, wherein the microphone is a microphone array.

20. The computing device of claim 15, further comprising means for identifying an indication that a host of the network-based communication session has recognized the user prior to framing the user.

\* \* \* \* \*